United States Patent
Naka et al.

(10) Patent No.: US 12,401,239 B2
(45) Date of Patent: Aug. 26, 2025

(54) CORE, ROTATING ELECTRICAL MACHINE, AND STATIONARY APPARATUS

(71) Applicant: DAIKIN INDUSTRIES, LTD., Osaka (JP)

(72) Inventors: Shoujirou Naka, Osaka (JP); Hiroshi Hibino, Osaka (JP); Daisuke Hiratsuka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 245 days.

(21) Appl. No.: 18/127,547

(22) Filed: Mar. 28, 2023

(65) Prior Publication Data

US 2023/0238841 A1 Jul. 27, 2023

Related U.S. Application Data

(63) Continuation of application No. PCT/JP2021/035757, filed on Sep. 29, 2021.

(30) Foreign Application Priority Data

Sep. 30, 2020 (JP) ................................. 2020-164403

(51) Int. Cl.
*H02K 1/12* (2006.01)
*F25B 31/02* (2006.01)
*H02K 1/20* (2006.01)

(52) U.S. Cl.
CPC ............. *H02K 1/20* (2013.01); *F25B 31/026* (2013.01)

(58) Field of Classification Search
CPC . H02K 1/20; H02K 1/185; H02K 1/12; F25B 31/026; H01F 3/02
See application file for complete search history.

(56) References Cited

U.S. PATENT DOCUMENTS

| 4,085,347 A * | 4/1978 | Lichius ............... H02K 15/021 174/DIG. 20 |
| 7,859,163 B2 * | 12/2010 | Bertocchi ........... H01F 41/0233 310/216.048 |
| 8,015,691 B2 | 9/2011 | Miyake et al. |
| 10,340,754 B2 | 7/2019 | Ogino et al. |

FOREIGN PATENT DOCUMENTS

| JP | 2000-152570 A | 5/2000 |
| JP | 2012-161139 A | 8/2012 |
| JP | 2019-180160 A | 10/2019 |
| JP | 2020-178411 A | 10/2020 |

OTHER PUBLICATIONS

International Preliminary Report of corresponding PCT Application No. PCT/JP2021/035757 dated Apr. 13, 2023.
International Search Report of corresponding PCT Application No. PCT/JP2021/035757 dated Nov. 9, 2021.
European Search Report of corresponding EP Application No. 2187 5659.1 dated Jul. 18, 2024.

* cited by examiner

*Primary Examiner* — Thomas Truong
(74) *Attorney, Agent, or Firm* — GLOBAL IP COUNSELORS, LLP

(57) ABSTRACT

A core includes a laminated body. The laminated body includes a plurality of electrical steel sheets stacked one on another. The laminated body includes a contact area between a pair of adjacent electrical steel sheets of the plurality of electrical steel sheets. The contact area includes a first friction area and a second friction area with friction coefficients different from each other.

8 Claims, 2 Drawing Sheets

CORE, ROTATING ELECTRICAL MACHINE, AND STATIONARY APPARATUS

CROSS-REFERENCE TO RELATED APPLICATIONS

This is a continuation of International Application No. PCT/JP2021/035757 filed on Sep. 29, 2021, which claims priority to Japanese Patent Application No. 2020-164403, filed on Sep. 30, 2020. The entire disclosures of these applications are incorporated by reference herein.

BACKGROUND

Technical Field

The present disclosure relates to a core, a rotating electrical machine, and a stationary apparatus.

Background Art

Rotating electrical machines, such as motors and generators, have been known. Japanese Unexamined Patent Publication No. 2019-180160 discloses a motor including a stator and a rotor. According to Japanese Unexamined Patent Publication No. 2019-180160, the stator includes a stator core (as a core), and the rotor includes a rotor core (as a core). In the motor according to Japanese Unexamined Patent Publication No. 2019-180160, an air gap is left between the stator core and the rotor core.

SUMMARY

A first aspect of the present disclosure is directed to a core including a laminated body. The laminated body includes a plurality of electrical steel sheets stacked one on another. The laminated body includes a contact area between a pair of adjacent electrical steel sheets of the plurality of electrical steel sheets. The contact area includes a first friction area and a second friction area with friction coefficients different from each other.

DETAILED DESCRIPTION OF EMBODIMENT(S)

Embodiments of the present disclosure will be described below with reference to the accompanying drawings. The following embodiments are merely preferred examples in nature, and is not intended to limit the scope, applications, or use of the present disclosure.

An embodiment of the present disclosure will be described below with reference to the drawings. The embodiment below is merely exemplary one in nature, and is not intended to limit the scope, applications, or use of the present invention.

EMBODIMENT

Figure 1:
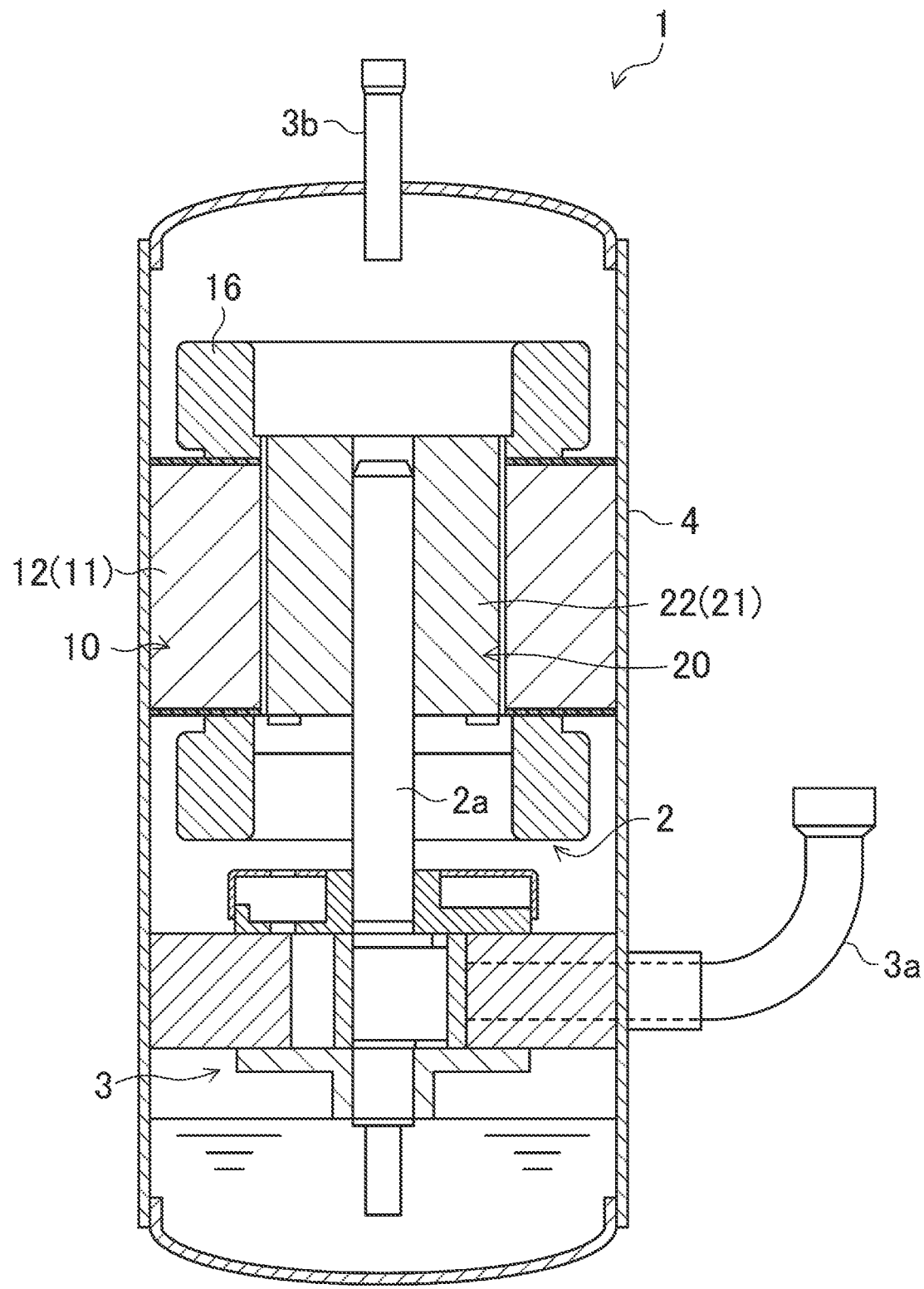
FIG. 1 is a longitudinal cross-sectional view of a compressor according to an embodiment.

An embodiment will be described. FIG. 1 shows a compressor (1) according to a first embodiment. The compressor (1) is disposed, for example, in a refrigerant circuit (not shown) of an air conditioner. The compressor (1) compresses a refrigerant in the refrigerant circuit. As shown in FIG. 1, the compressor (1) includes a motor (2), a compression mechanism (3), and a casing (4).

The casing (4) is a container that houses the compression mechanism (3) and the motor (2). The casing (4) is a holding member that holds a stator (10) of the motor (2).

The casing (4) is a closed container. The casing (4) is made of metal, such as iron. The casing (4) is formed, for example, by forming a cylindrical member by so-called "roll bending" a sheet metal (e.g., a sheet of a material such as iron) and welding end plates (e.g., metal, such as iron) to both ends of the cylindrical member.

The compression mechanism (3) compresses a fluid (a refrigerant in this example). The compression mechanism (3) may be any one of various fluid machines. For example, the compression mechanism (3) may be a rotary compression mechanism, a scroll compression mechanism, or any other suitable mechanism. In this example, the compression mechanism (3) takes a fluid in from an intake pipe (3a) provided in a side surface of the casing (4) and discharges the compressed fluid into the casing (4). The fluid (i.e., refrigerant) discharged into the casing (4) is discharged through a discharge pipe (3b).

Configuration of Motor

The motor (2) is an example of a rotating electrical machine. The motor (2) drives the compression mechanism (3). The motor (2) is a magnet embedded type rotating electrical machine. The motor (2) includes the stator (10), a rotor (20), and a shaft (2a).

The shaft (2a) is a holding member that holds the rotor (20). The shaft (2a) is made of metal, such as iron. The shaft (2a) is connected to the compression mechanism (3) as well.

In the following description, an axial direction corresponds to the direction in which the center of the shaft (2a) extends. A radial direction is orthogonal to the axial direction. A circumferential direction extends along a circle around the center of the shaft (2a).

Rotor

The rotor (20) includes a rotor core (21) and a permanent magnet (not shown). The permanent magnet is housed in a through hole in the rotor core (21).

The rotor core (21) includes a laminated body (22). The laminated body (22) is a cylindrical member. The laminated body (22) is formed by stacking a large number of plate members (hereinafter referred to as "rotor plates (23)") in the axial direction. The rotor core (21) is a so-called laminated core.

The rotor plates (23) are electrical steel sheets. The rotor plates (23) are manufactured by pressing electrical steel sheets, for example. The rotor plates (23) are coated with an insulating film. The rotor core (21) is manufactured by fixing the rotor plates (23) to each other through crimping, for example. Each rotor plate (23) has, at its center, a through hole for inserting the shaft (2a).

Stator

The stator (10) includes the stator core (11) and a coil (16). The stator core (11) corresponds to the "core" according to the present disclosure. The stator core (11) includes a laminated body (12) and a fastener (13). The laminated body (12) is a cylindrical member. The laminated body (12) is formed by stacking a large number of plate members (hereinafter referred to as "stator plates (17)") in the axial direction. In other words, the stator plates (17) are stacked in a direction substantially parallel to the axial direction. The stator core (11) is a so-called "laminated core".

The stator plates (17) are electrical steel sheets. The stator plate (17) are manufactured by pressing electrical steel sheets, for example. The stator plates (17) are coated with an insulating film. The stator core (11) is manufactured by fastening the stator plates (17) to each other with a bolt. In this example, the bolt serves as the fastener (13). The fastener (13) fastens a pair of adjacent electrical steel sheets. The stator plates (17) may be fastened to each other by crimping or welding.

Figure 2:
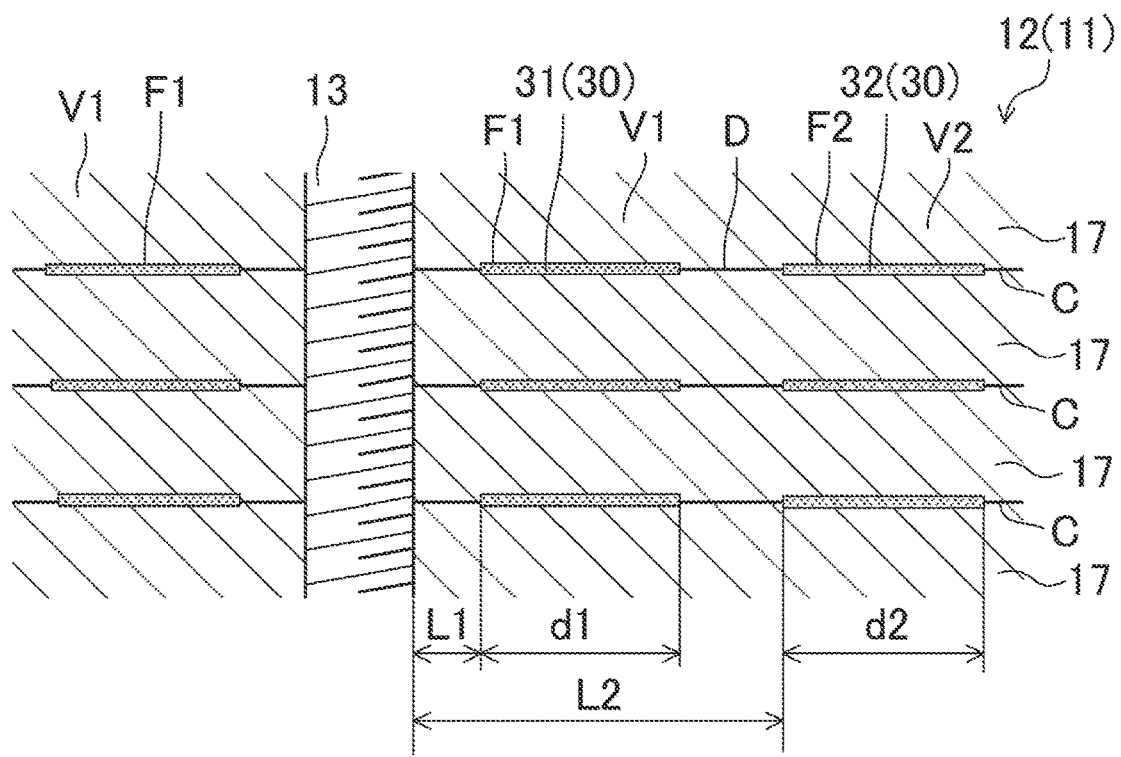
FIG. 2 is an enlarged cross-sectional view of a periphery of a fastener of a stator core.

As shown in FIG. 2, the laminated body (12) has a plurality of contact areas (C). Each contact area (C) is interposed between a pair of adjacent stator plates (17, 17) of the laminated body (12). In other words, each contact area (C) is interposed between a pair of adjacent electrical steel sheets among the plurality of electrical steel sheets.

The contact areas (C) include direct contact areas (D) and a plurality of friction areas (F1, F2). In each direct contact area (D), a pair of adjacent stator plates (17, 17) are in direct contact with each other. The friction areas (F1, F2) have different friction coefficients from the direct contact areas (D). The plurality of friction areas (F1, F2) have friction coefficients different from each other. The "friction coefficients" used herein include coefficients of static friction and dynamic friction.

The plurality of friction areas (F1, F2) includes a first friction area (F1) and a second friction area (F2). The respective friction coefficients of the friction areas (F1, F2) are measured in accordance with JIS K7125: 1999.

The first friction area (F1) is located around the fastener (13). In this example, the first friction area (F1) surrounds the fastener (13) at a predetermined distance from the fastener (13).

The second friction area (F2) is farther from the fastener (13) than the first friction area (F1) is. Here, assume that the shortest distance between the fastener (13) and the first friction area (F1) is a first distance L1, and the shortest distance between the fastener (13) and the second friction area (F2) is a second distance L2. The second distance L2 is longer than the first distance L1 (i.e., L1<L2). In other words, the first friction area (F1) is closer to the fastener (13) than the second friction area (F2) is.

Each first friction area is in a ring shape with a width (i.e., length in the radial direction) d1. Each second friction area (F2) is formed in a band shape with a width d2. In this example, the widths d1 of the first friction areas (F1) in the respective contact areas (C) are the same. The widths d2 of the respective second friction areas (F2) in the contact areas (C) are also the same. The plurality of first friction areas (F1) overlap each other in the stacking direction, and the plurality of second friction areas (F2) overlap each other in the stacking direction.

One of each pair of stator plates (17, 17) is provided with a surface member (30) on its surface. In this example, the lower one of the pair of stator plates (17, 17) is provided with a first surface member (31) and a second surface member (32) on its surface. The first surface member (31) is made of rubber. The second surface member (32) is made of resin. The first friction area (F1) is interposed between the first surface member (31) and the stator plate (17). The second friction area (F2) is interposed between the second surface member (32) and the stator plate (17). The friction coefficient $\mu 2$ of the second friction area (F2) is smaller than the friction coefficient $\mu 1$ of the first friction area (F1) (i.e., $\mu 1 > \mu 2$).

Once the motor is driven, an electromagnetic force acts on a gap (so-called "air gap") between the stator (10) and the rotor (20). This electromagnetic force excites the laminated body (12). The excitation of the laminated body (12) causes a pair of adjacent stator plates (17, 17) to oscillate. Each contact area (C) includes the plurality of friction areas (F1, F2) with different friction coefficients. Accordingly, when the pair of stator plates (17, 17) oscillate, the portions of the pair of stator plates (17, 17) forming the friction areas (F1, F2) move in different amounts in the shear direction.

Specifically, the friction coefficient $\mu 2$ of the second friction area (F2) is smaller than the friction coefficient $\mu 1$ of the first friction area (F1) (i.e., $\mu 1 > \mu 2$). Accordingly, the stator plates (17) are less likely to move with respect to the first surface member (31) in the first friction area (F1) in the shear direction, and more likely to move with respect to the second surface member (32) in the second friction area (F2) in the shear direction.

Oscillation of the laminated body (12) causes a pair of adjacent stator plates (17, 17) to oscillate in a predetermined amount of oscillation in the periphery of the fastener (13). Unlike the periphery of the fastener (13), the stator plates (17) are not fixed to each other in a portion away from the fastener (13) and hence oscillate in a greater amount of oscillation than in a first oscillating portion (V1).

The periphery of the fastener (13), where the stator plates (17, 17) oscillate in a predetermined amount of oscillation, is regarded as the first oscillating portion (V1), and the portion that is away from the fastener (13) and oscillates in a greater amount of oscillation than in the first oscillating portion (V1) is regarded as a second oscillating portion (V2). The first friction area (F1) is formed in the first oscillating portion (V1), and the second friction area (F2) is formed in the second oscillating portion (V2).

Since the second oscillating portion (V2) that oscillates in a greater amount of oscillation than the first oscillating portion (V1) has a smaller friction coefficient than the first oscillating portion (V1), the stator plates (17) can move in a greater amount with respect to the second surface member (32) in the second oscillating portion (V2). Accordingly, the oscillation energy at the second oscillating portion (V2) can be converted into the thermal energy caused by friction, which can further attenuate the oscillations of the pair of stator plates (17, 17).

Features of First Embodiment

Feature (1) of this embodiment is that the contact area (C) includes a first friction area (F1) and a second friction area (F2) with friction coefficients different from each other.

According to Feature (1) of this embodiment, the first and second friction areas (F1) and (F2) with different friction coefficients can be located at portions that oscillate in different amounts of oscillation when the pair of stator plates (17, 17) are excited, in order to provide an attenuation effect. It is therefore possible to reduce the oscillations of the stator core (11).

Feature (2) of this embodiment is that the pair of stator plates (17, 17) include: a first oscillating portion (V1) that oscillates in a predetermined amount of oscillation when excited; and a second oscillating portion (V2) that oscillates in a greater amount of oscillation than the first oscillating portion (V1), that the first friction area (F1) is located in the first oscillating portion (V1), that the second friction area (F2) is located in the second oscillating portion (V2), and that the second friction area (F2) has a smaller friction coefficient than the first friction area (F1).

According to Feature (2) of this embodiment, the second friction area (F2) with a smaller friction coefficient than the first friction area (F1) is located in the second oscillating portion (V2) that oscillates in a greater amount of oscillation than the first oscillating portion (V1). When the laminated body (12) oscillates, the amount of movement of the stator plates (17) is greater in the second oscillating portion (V2) than in the first oscillating portion (V1). Accordingly, the oscillation energy at the second oscillating portion (V2) can be converted into the thermal energy caused by friction, which further attenuates the oscillations of the pair of stator plates (17, 17).

Feature (3) of this embodiment is that the first friction area (F1) is closer to the fastener (13) than the second friction area (F2) is.

According to Feature (3) of this embodiment, the amount of oscillation of the pair of stator plates (17, 17) is smaller in a portion close to the fastener (13) than in a portion away from the fastener (13). The oscillations of the pair of the stator plates (17, 17) are further attenuated since the first friction area (F1) is closer to the fastener (13) than the second friction area (F2) is.

Feature (4) of this embodiment is that at least one of the pair of stator plates (17, 17) is provided with a surface member (30) on a surface thereof, and at least one of the first friction area (F1) or the second friction area (F2) is located on the surface member (30).

According to Feature (4) of this embodiment, at least one of the first friction area (F1) or the second friction area (F2) is located on the surface member (30). This configuration can attenuate the oscillations of the pair of stator plates (17, 17).

VARIATIONS OF EMBODIMENT

First Variation

Figure 3:
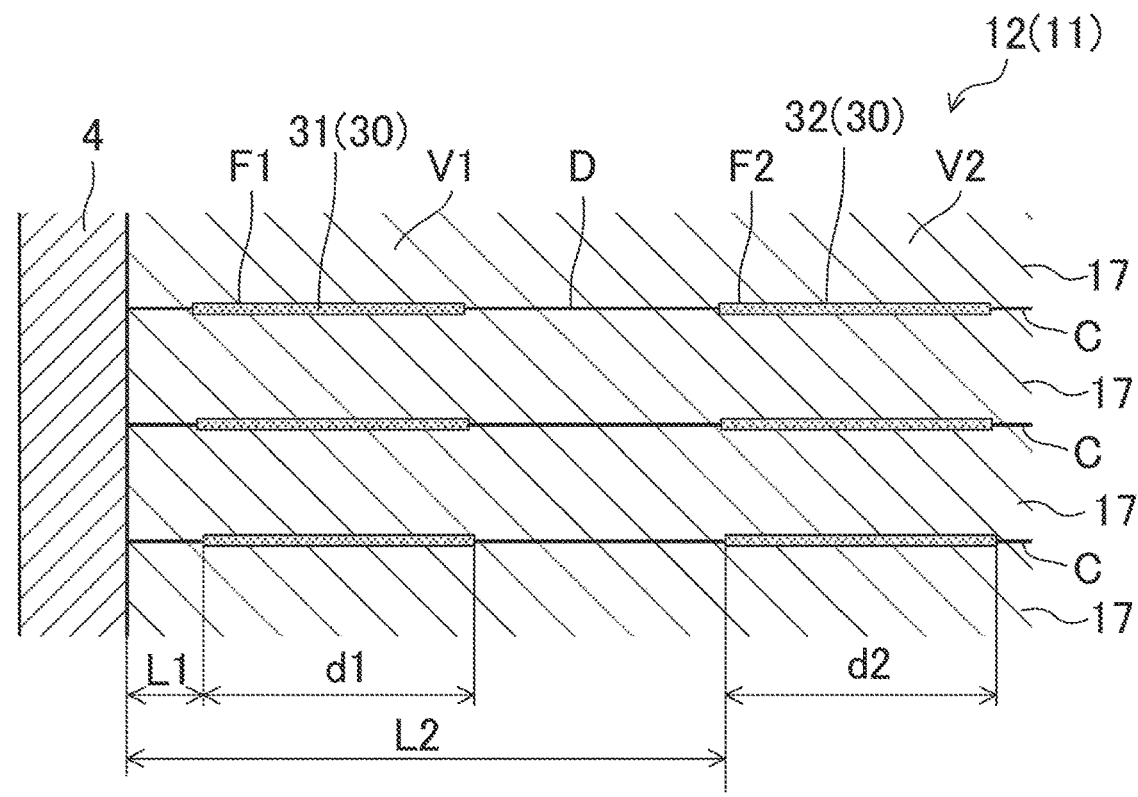
FIG. 3 is an enlarged cross-sectional view of a stator core in the vicinity of a casing according to a first variation.

As shown in FIG. 3, in the stator core (11) according to this embodiment, the first friction area (F1) may be located near the casing (4).

Specifically, the laminated body (12) of the stator core (11) is held by the casing (4). The first friction area (F1) extends in the circumferential direction along the casing (4) at a predetermined distance from the inner circumferential surface of the casing (4) in the radial direction. The second friction area (F2) is farther from the casing (4) than the first friction area (F1) is. The second friction area (F2) extends in the circumferential direction at a predetermined distance from the first friction area (F1) in the radial direction. The distance L2 between the second friction area (F2) and the casing (4) is longer than the distance L1 between the first friction area (F1) and the casing (4) (i.e., L1<L2).

In this example as well, oscillation of the laminated body (12) causes a pair of stator plates (17, 17) to oscillate in a predetermined amount of oscillation in the vicinity of the casing (4) holding the laminated body (12) (i.e., in the first oscillating portion (V1)). On the other hand, the stator plates (17) can move relative to each other in a portion away from the casing (4) (i.e., in the second oscillating portion (V2)) and thus oscillate in a greater amount of oscillation than in the first oscillating portion (V1).

Since the second oscillating portion (V2) away from the casing (4) has a smaller friction coefficient than the first oscillating portion (V1) near the casing (4), the stator plates (17) can move in a greater amount with respect to the second surface member (32) in the second oscillating portion (V2). Accordingly, the oscillation energy at the second oscillating portion (V2) can be converted into the thermal energy caused by friction, which can further attenuate the oscillations of the pair of stator plates (17, 17).

Second Variation

In the stator core (11) according to this embodiment, the surface member (30) may be an adhesive, varnish, a coating agent applied to the surfaces of the stator plates (17), or any other suitable substances. The configuration according to this variation, to, can attenuate the oscillations of the pair of stator plates (17, 17).

Third Variation

In the stator core (11) according to this embodiment, the surface roughness may differ between the first and second friction areas (F1) and (F2) of a pair of stator plates (17, 17).

Specifically, for example, at least one of the friction areas (F1, F2) may be produced by applying a surface finish to at least one of the pair of stator plates (17, 17) to change the roughness of the surface. In other words, instead of providing the surface member (30) on the stator plate (17), a surface finish may be applied to the stator plate (17) to change the surface roughness.

In the case of applying a surface finish to change the surface roughness, at least one of the pair of stator plates (17, 17) may have fine asperities on a surface in the first friction area (F1) or the second friction area (F2). A surface of at least one of the pair of stator plates (17, 17) may be mirror finished.

Here, the surface roughness is an arithmetic average roughness (Ra). The surface roughness is measured in this variation using a contact surface roughness tester. The second friction area (F2) has a smaller arithmetic average roughness than the first friction area (F1).

In this variation as well, the surface roughness differs between the first friction area (F1) and the second friction area (F2), thereby making it possible for the first friction area (F1) and the second friction area (F2) to have different friction coefficients.

Other Embodiments

The above-described embodiment may be modified as follows.

In the stator core (11) according to the embodiment described above, the stator plates (17) may be fixed to each other by crimping. In this case, the crimped part serves as the fastener (13) of the present disclosure.

In the stator core (11) according to the embodiment described above, the fastener (13) and the first friction area (F1) may be in contact with each other. In other words, the first distance L1, which is the shortest distance between the fastener (13) and the first friction area (F1), may be zero.

In the stator core (11) according to the embodiment described above, the first friction area (F1) and the second friction area (F2) may be in contact with each other.

In the stator core (11) according to the embodiment described above, the widths d1 of the first friction areas (F1) in the respective contact areas (C) are not necessarily the same. Similarly, the widths d2 of the respective second friction areas (F2) are not necessarily the same.

In the stator core (11) according to the embodiment described above, some of the plurality of contact areas (C) may have a plurality of friction areas (F1, F2).

The configuration of the contact areas (C) according to the embodiment described above may be applied to the rotor core (21). In this case, the shaft (2a) corresponds to the "holding member" according to the present disclosure.

While a motor has been described as an example of a rotating electrical machine in the embodiment described above, the configuration of the contact areas (C) may be applied to a generator.

The configuration of the contact areas (C) according to the embodiment described above may be applied to a stationary apparatus.

While the embodiment and variations thereof have been described above, it will be understood that various changes in form and details may be made without departing from the spirit and scope of the claims. The embodiments, the variations, and the other embodiments may be combined and replaced with each other without deteriorating intended functions of the present disclosure.

The ordinal numbers such as "first," "second," "third," . . . , described above are used to distinguish the terms to which these expressions are given, and do not limit the number and order of the terms.

As described above, the present disclosure is useful for a core, a rotating electrical machine, and a stationary apparatus.

The invention claimed is:

1. A core comprising:
   a laminated body including a plurality of electrical steel sheets stacked one on another,
   the laminated body including a contact area between a pair of adjacent electrical steel sheets of the plurality of electrical steel sheets,
   the contact area including
      a direct contact area where the pair of adjacent electrical steel sheets are in direct contact with each other; and
      a first friction area and a second friction area respectively having different friction coefficients from the direct contact area, and
   the friction coefficients of the first friction area and the second friction area being different from each other.

2. The core according to claim 1, wherein
   the pair of electrical steel sheets include
      a first oscillating portion that oscillates in a predetermined amount of oscillation when excited, and
      a second oscillating portion that oscillates in a greater amount of oscillation than the first oscillating portion,
   the first friction area is located in the first oscillating portion,
   the second friction area is located in the second oscillating portion, and
   the second friction area has a smaller friction coefficient than the first friction area.

3. The core according to claim 1, further comprising:
   a fastener configured to fasten the pair of electrical steel sheets,
   the first friction area being closer to the fastener than the second friction area, and
   the second friction area having a smaller friction coefficient than the first friction area.

4. The core according to claim 1, wherein
   the laminated body is held by a holding member,
   a distance between the second friction area and the holding member is longer than a distance between the first friction area and the holding member, and
   the second friction area has a smaller friction coefficient than the first friction area.

5. The core according to claim 1, wherein
   at least one of the pair of electrical steel sheets is provided with a surface member on a surface thereof, and
   at least one of the first friction area and the second friction area is located on the surface member.

6. The core according to claim 1, wherein
   the first friction area and the second friction area of the pair of electrical steel sheets differ from each other in surface roughness.

7. A rotating electrical machine including the core according to claim 1.

8. A stationary apparatus including the core according to claim 1.

* * * * *